United States Patent [19]

Perrott

[11] Patent Number: 4,712,574

[45] Date of Patent: Dec. 15, 1987

[54] VACUUM-BREAKING VALVE FOR PRESSURIZED FLUID LINES

[75] Inventor: Charles H. Perrott, Portland, Oreg.

[73] Assignee: C. H. Perrott, Inc., Portland, Oreg.

[21] Appl. No.: 41,401

[22] Filed: Apr. 23, 1987

[51] Int. Cl.⁴ ............................................. F16K 24/04
[52] U.S. Cl. ................................. 137/217; 137/454.2; 137/517; 137/854
[58] Field of Search ........... 137/107, 217, 218, 512.15, 137/512.4, 517, 854, 454.2

[56] References Cited

U.S. PATENT DOCUMENTS

| Re. 30,849 | 1/1982 | Crist . | |
|---|---|---|---|
| 1,755,993 | 4/1930 | Kelley et al. | 137/218 |
| 2,115,499 | 4/1938 | Salvoni . | |
| 2,259,984 | 10/1941 | Anderson . | |
| 2,405,639 | 8/1946 | Boosey . | |
| 2,502,211 | 3/1950 | Dyer . | |
| 2,686,528 | 8/1954 | Snyder . | |
| 2,738,798 | 3/1956 | Goodrie . | |
| 2,777,464 | 1/1957 | Mosely | 137/517 |
| 3,145,724 | 8/1964 | Pelzer . | |
| 4,022,244 | 5/1977 | Oman | 137/517 |
| 4,508,136 | 4/1985 | Kah, Jr. . | |

*Primary Examiner*—Gerald A. Michalsky
*Attorney, Agent, or Firm*—Eugene D. Farley

[57] ABSTRACT

For use in pressurized fluid lines, an anti-siphon and back-flow prevention valve. A conduit is tapped into the line upstream of an outlet terminating in a ball-shaped housing. The housing receives check valve means arranged for insuring that fluid does not escape during normal operation of the line, but for admitting vacuum-breaking air in the event of line pressure loss.

5 Claims, 4 Drawing Figures

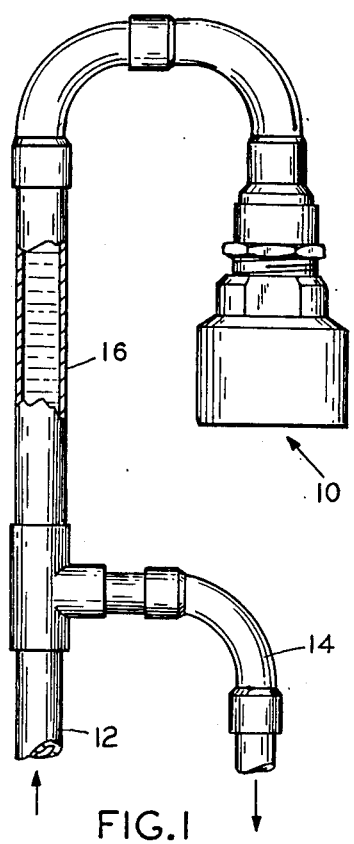
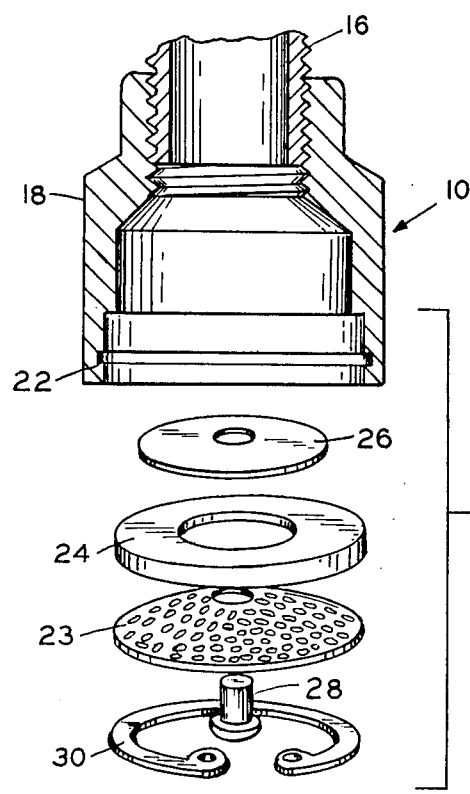
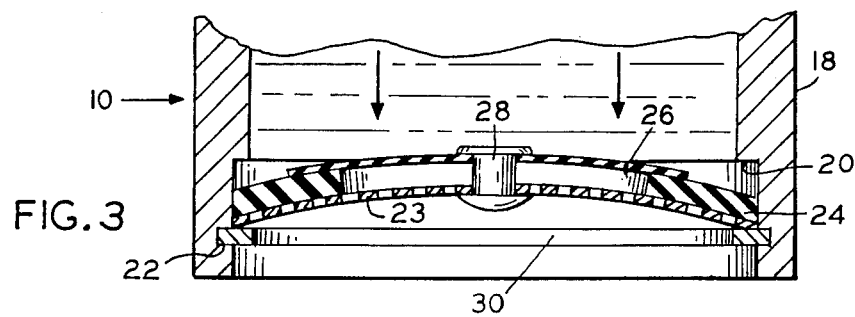
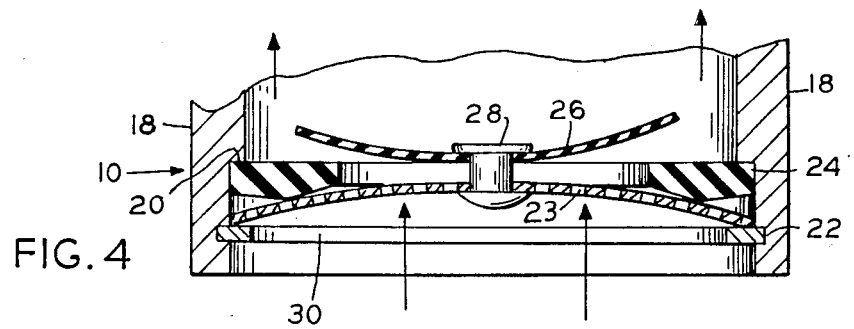

VACUUM-BREAKING VALVE FOR PRESSURIZED FLUID LINES

BACKGROUND AND GENERAL STATEMENT OF THE INVENTION

This invention relates to vacuum-breaking valves for pressurized fluid lines.

Vacuum-breaking valves of the general type described herein are used widely in fluid supply systems to prevent back siphoning, or flow reversal whenever an operational variant causes a vacuum to be produced in the supply system. This is of particular importance in the case of Municpal Water Supply Systems which are subject to pressure variation. If the pressure in the supply system drops below atmospheric pressure, even momentarily, contaminating materials present in the house delivery system may be drawn into the main line with obviously disadvantageous results.

Such a situation may occur, for example, when water is supplied to mortuaries, hospitals, laboratories, laundries, chemical processing installations and the like. All of these may introduce serious sources of contamination into possible communication with the domestic tap water. Examples of such sources are the formaldehyde wash waters used for disinfecting kidney machines; mortuary fluids and wash waters; bacteriologically contaminated laboratory solutions; poisonous chemical solutions, etc.

No problem exists as long as normal pressure is maintained on the house line supplying water under pressure to the installation. However, in the event of failure of the pressurized water source, disconnecting the pressurized line for purposes of installation or repair or other occurrences, circumstances frequently arise wherein the pressure in the pressurized house line is reduced sharply. A vacuum may even be created. In such occurrences, contaminating fluids may be drawn into the system and subsequently discharged through the domestic tap.

It is the general purpose of the present invention to provide a vacuum-breaking valve for pressurized fluid lines which provides a solution to the above described problem.

It is a further object of the present invention to provide a vacuum-breaking valve which is simple in construction, efficient in operation, easily installed, adaptable for use in a wide variety of plumbing situations; and reliable and trouble-free in operation.

Broadly stated, the vacuum-breaking valve of my invention is adapted for use in a pressurized fluid line delivering liquid to an outlet. It includes a conduit adapted for tapping into the line upstream of the outlet.

A bell-shaped housing connects to the conduit and is mounted thereon, in inverted position. The interior of the housing has an annular, outwardly facing shoulder which provides a seat for check valve means dimensioned for reception in the housing.

A retainer is positioned in the housing for releasably retaining the check valve therein. As long as pressure is maintained in the fluid line, the check valve remains closed. However, if there is a serious drop in pressure in the line, the check valve opens, admitting air, breaking the vacuum, and preventing back-flow of contaminated materials into the system.

THE DRAWINGS

In the Drawings

FIG. 1 is a view in side elevation, partly in section, of the vacuum breaking valve of my invention in its use position.

FIG. 2 is an exploded, top perspective view of the valve.

FIGS. 3 and 4, are fragmentary, longitudinal, sectional views of the valve in operation, FIG. 3 showing the valve in its closed, pressurized position and FIG. 4 showing the valve in its open, vacuum-breaking position.

DESCRIPTION OF A PREFERRED EMBODIMENT

Referring to FIG. 1, the valve, indicated generally at 10, is illustrated connected to a pressurized fluid conduit or house line 12, and a delivery line 14 leading, for example, to an appliance which might be a source of contamination in the event of the development of vacuum in house line 12.

The valve assembly is connected to a conduit 16 adapted to be tapped into the house line just upstream from the outlet.

Referring to FIG. 2, the valve elements are housed in a bell-shaped housing 18 threaded onto the outer end of conduit 16. The interior of the housing is provided with an annular, outwardly facing shoulder 20 and, a spaced distance outwardly thereof, an annular groove 22.

The valve assembly includes an outwardly concave, perforated, backup plate 23, a floating, centrally ported valve seat plate 24, and a flexible valve disc 26. In the assembled condition, backup plate 23 is interconnected with valve disc 26 by means of a rivet 28 or other suitable interconnecting means.

The assembled check valve thus has the appearance illustrated in FIGS. 3 and 4. Valve seat plate 24 is confined by rivet 28 in operative position between backup plate 23 and valve disc 26.

Retaining means is provided for releasably retaining the valve assembly within housing 18. In the illustrated form of the invention, the retaining means comprises a snap ring 30 releasably seated in annular groove 22.

When assembled, backup plate 23 bears against retaining ring 30 and the margins of valve seat plate 24 are seated against shoulder 20. Both the valve seat plate 24 and valve disc 26 are fabricated from flexible materials such as natural or synthetic rubber, and accordingly conform to the inwardly concave, or bowed, structure of backup plate 23. As is especially evident in FIG. 3, this enables the assembly to withstand the substantial pressure exerted by the fluid present in the system.

The use positions of the check valve assembly are also illustrated in FIGS. 3 and 4.

In FIG. 3, the normal condition of the valve assembly is illustrated, closed against escape of pressurized fluid within the system.

FIG. 4 illustrates the open position of the valve, which occurs when a condition of reduced pressure is present within the system. When that occurs, atmospheric air passes through the perforations in backup plate 23, through the central opening in valve seat plate 24, and around the edges of the inwardly flexed valve disc 26. This breaks the vacuum and prevents the back-flow of contaminating fluids present in delivery conduit 14 into the main line 12.

Having thus described in detail a preferred embodiment of the present invention, it will be apparent to those skilled in the art that various physical changes may be made in the device described herein without altering the inventive concepts and principles embodied. The present embodiment is therefore to be considered in all respects as illustrative and not restrictive, the scope of the invention being indicated by the appended claims. All changes which come within the meaning and range of equivalency of the claims are therefore to be embraced therein.

I claim:

1. For use in a pressurized line delivering liquid to an outlet, a vacuum breaking valve for preventing backflow and siphoning comprising:
    (a) a conduit adapted for tapping into the line upstream of the outlet,
    (b) a housing having an open end connected to the conduit,
    (c) the interior of the housing having an annular, outwardly facing shoulder,
    (d) check valve means dimensioned for reception in the housing, seated against the shoulder, and
    (e) retaining means position in the housing for releasably retaining the check valve means therein,
    (f) the check valve means comprising,
        (1) a perforated backup plate adapted for bearing engagement with the retaining means,
        (2) a floating, centrally ported valve seat plate seated against the shoulder and bearing against the backup plate,
        (3) a flexible, valve disc overlying the port in the valve seat plate in valving relation thereto, and
        (4) centrally located interconnecting means interconnecting the backup plate and the valve disc, confining the valve seat plate in operative positions between them.

2. The valve of claim 2 wherein the interconnecting means comprises rivet means.

3. The valve of claim 2 wherein the retaining means comprises snap ring means.

4. The valve of claim 2 wherein the backup plate is concavely arcuate.

5. The valve of claim 1 wherein the housing is bell-shaped.

* * * * *